July 9, 1946.  J. F. FRANZEN  2,403,514
APPARATUS FOR CUTTING METAL ALONG CURVED LINES
Filed Sept. 10, 1943
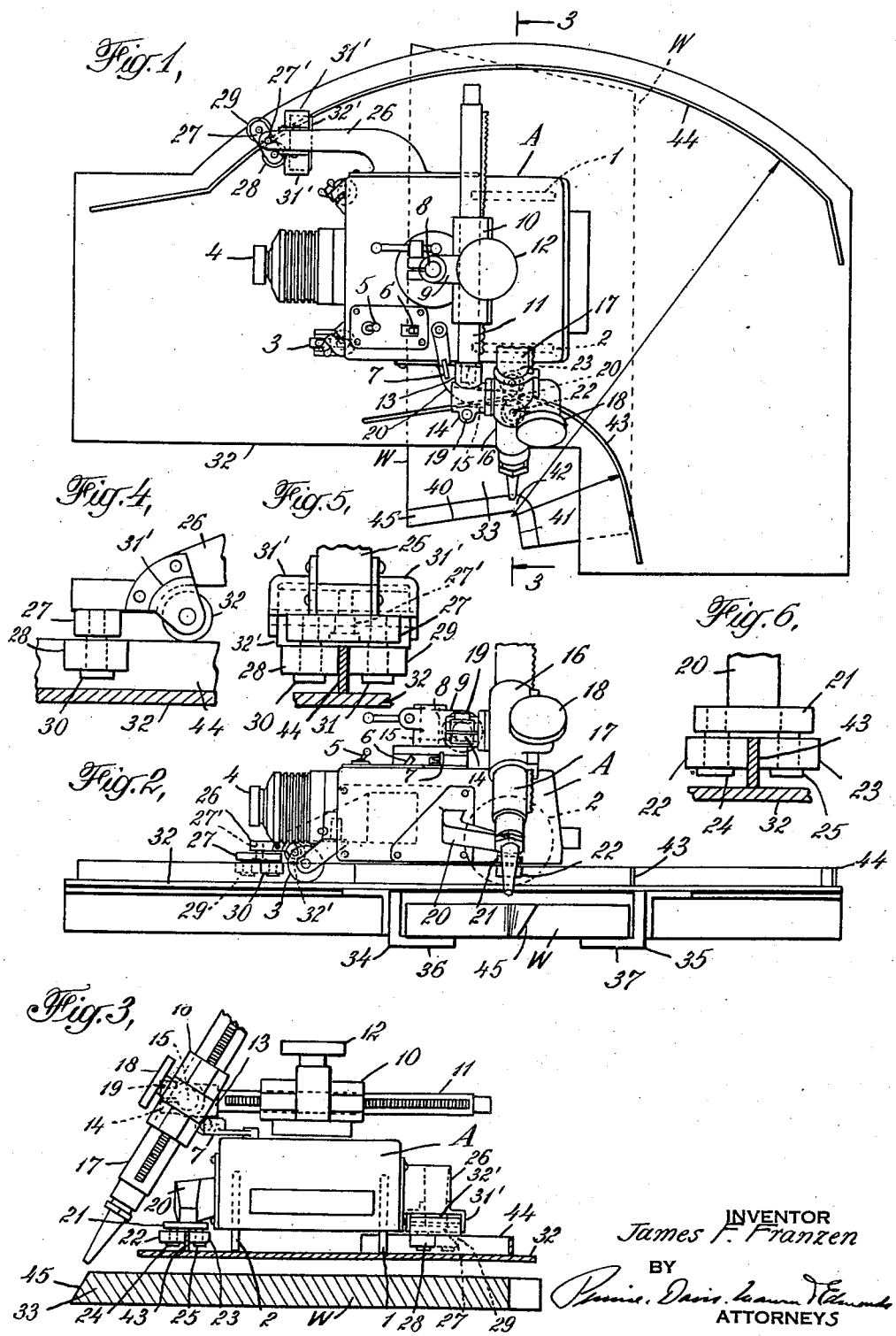
INVENTOR
James F. Franzen
BY
ATTORNEYS Patented July 9, 1946

2,403,514

UNITED STATES PATENT OFFICE 2,403,514

APPARATUS FOR CUTTING METAL ALONG CURVED LINES

James F. Franzen, Chicago, Ill., assignor to Air Reduction Company, Incorporated, a corporation of New York Application September 10, 1943, Serial No. 501,885

4 Claims. (Cl. 266—23)

This invention relates to apparatus for cutting metal work-pieces by means of gas cutting torches and more particularly to apparatus for cutting a bevelled edge on the work-piece along a curved line.

It is common practice to cut metal plates and other work-pieces by means of an oxyacetylene torch mounted on a self-propelled carriage adapted to run on a track or directly on the work. According to the present invention such a torch carriage is made useful for cutting metal work-pieces along a curved line having a relatively small radius that produces a curved corner with a rather abrupt bend. For this purpose certain additional parts are attached to the carriage which cooperate with guiding means along the course of the carriage all adapted and arranged to cause movement of the carriage in a predetermined manner to produce a curved cut of the desired type. The improved apparatus is intended primarily for cutting on a metal work-piece a bevelled edge that has a rather abruptly curved corner of the kind above referred to and for producing a uniform bevel all along the edge despite the curved corner of relatively small radius.

The invention is illustrated in the accompanying drawing in which:

Fig. 1 is a plan view of the apparatus;

Fig. 2 is a side elevation of the apparatus shown in Fig. 1;

Fig. 3 is a transverse section taken on the line 3—3 of Fig. 1;

Fig. 4 is a detail view in side elevation showing the guide rollers which engage the outer guide rail;

Fig. 5 is an end view of the parts shown in Fig. 4 as viewed from right to left; and Fig. 6 is a detail view corresponding to Fig. 5 showing the guide rollers which engage the inner guide rail.

The torch carriage is represented in general at A. It may be of a well-known type such as that disclosed in the patent to J. L. Anderson, No. 2,266,730. It has a pair of forward wheels 1 and 2, and in the present instance, a single rear caster wheel 3, although two rear caster wheels may be used if desired, one at each rear corner of the carriage. One of the front wheels is driven by an electric motor within the carriage (not shown) and the other front wheel is an idler wheel. The motor is provided with a centrifugal speed control governor adapted to be adjusted by turning the knob 4 so that the carriage may be made to move along its course at the desired uniform cutting speed. The usual electric switches for controlling the motor are shown at 5 and 6, and the usual clutch lever at 7.

The carriage has a vertical post 8 to which a bracket 9 is clamped. The bracket is provided with a sleeve 10 in which a torch arm 11 is mounted. The torch arm projects laterally from the carriage and may be adjusted longitudinally of itself in the sleeve 10 by turning a knob 12 (Figs. 1 and 3). A bracket 13 is clamped to the outer end of the arm 11 and has a split sleeve 14 which receives a stud 15 carried by the torch holder 16 and disposed longitudinally of the carriage. A gas cutting torch 17, such as an oxyacetylene cutting torch of the usual type, is mounted in the holder 16 and may be adjusted vertically therein by turning the knob 18. The torch holder 16 may be adjusted about the axis of the stud 15 and a nut 19 on the split sleeve 14 enables the sleeve to be clamped to the stud to retain the torch holder and the torch in adjusted position. When the apparatus is used for cutting a bevel on the work-piece the torch holder is adjusted about the axis of the stud 15 so that the torch makes the proper angle with the surface of the work-piece as best shown in Fig. 3.

The torch carriage, as well as the torch and the means for mounting it on the carriage, as thus far described, constitute a standard and well known piece of equipment. To adapt the carriage for the present purpose, it has attached to it, on the torch-side of the carriage, an arm 20 which extends forwardly as shown. This arm appears most clearly in Fig. 2. It rigidly carries a cross-piece 21 (Figs. 3 and 6) on which a pair of rollers 22, 23 are mounted by stud screws 24, 25. Another arm 26 (Fig. 1) is attached to the opposite side of the carriage and extends rearwardly. This arm likewise has a cross-piece or roller arm 27 (see also Figs. 4 and 5) but in this case it is pivotally supported by the arm 26 by means of a stud screw 27' (Figs. 1 and 5). A pair of rollers 28, 29 are mounted on the cross-piece 27 by means of stud screws 30, 31 as best shown in Fig. 5.

The carriage runs directly on a plate 32 which lies over part of the work-piece W. In the present instance the work-piece is represented as an elongated plate whose portion to be cut projects beyond the plate 32, as shown at 33 in Fig. 1. The work-piece may be supported in any suitable way under the plate 32. The particular supporting means shown in the drawing comprises a pair of angle irons 34, 35 welded or otherwise attached to the under surface of the plate 32 so that their horizontal flanges 36, 37 form ledges to support the work-piece when the work-piece is slid longitudinally into the compartment formed between the angle irons (Fig. 2). If desired suitable means may be employed to clamp the work-piece and hold it firmly in place during the cutting operation.

Assuming the end of the work-piece is to be cut along a line which will give it the shape shown in Fig. 1, i. e., with straight edges at 40 and 41 and an intermediate curved corner 42 having a rather small radius, then inner and outer guide rails 43, 44 having the configuration shown in Fig. 1, are tack-welded to the upper surface of the plate 32 in the positions shown. During movement of the torch carriage to cut the work-piece to the shape shown, the rollers 22, 23 on the arm 20 engage opposite vertical faces of the inner guide rail 43 and the rollers 28, 29 on the arm 26 engage opposite vertical faces of the outer guide rail 44. As will be seen from the drawing, the tip of the torch is substantially in transverse alignment with the contact points of the front carriage wheels, i. e. the points at which they contact with the plate 32, and the rollers 22, 23 engage the guide rail 43 at a point which is substantially in transverse alignment with the torch tip and the contact points of the front carriage wheels. The rollers 28, 29 engage the outer guide rail 44 at a point off the outer rear corner of the carriage.

To determine the configuration and position of the guide rails, the carriage is first moved over the plate 32 manually and the tip of the torch is made to follow the line along which the proposed cut is to be made in the work-piece. The paths followed by the rollers 22, 23 and 28, 29 are then indicated on the surface of the plate 32 and the guide rails are tack-welded to the plate accordingly. It will be seen from the drawing that each guide rail has straight end portions corresponding to the straight end portions of the cut to be made in the work-piece, and an intermediate curved portion corresponding to the curved corner to be cut in the work-piece.

If found necessary, a bearing bracket 31' may be attached to each side of the arm 26 near its rear end to constitute a journal mounting for a relatively wide roller 32' adapted to run on the top edge of the outer guide rail 44 and thereby support some of the weight of the corner of the carriage to which the arm 26 is attached.

If desired, and if the nature of the cut to be made in the work-piece requires it, the supporting wheels of the carriage could be made to run on a track before and after the carriage is under the influence of the guide rails 43, 44. However, the portion of the surface of the plate 32 over which the carriage travels while it is passing between the guide rails is trackless and the carriage is then under the influence of the guide rails only. Thus the supporting wheels of the carriage move along the surface of the plate 32 in the direction they are caused to move by the guide rails and in the particular fashion which will cause the torch to cut the relatively small-radius curved corner in the work-piece. The bevel 45 cut on the edge of the work-piece is uniform all along the edge despite the curved corner.

While the apparatus was intended primarily for cutting bevels along curved lines it may be used, if desired, for cutting along curved lines to produce a vertical-wall cut.

I claim:

1. Apparatus for cutting metal work-pieces comprising a self-propelled carriage having a pair of forward wheels and at least one rear caster wheel, a motor for driving one of the forward wheels, a torch arm mounted on the carriage and projecting laterally therefrom, a gas cutting torch carried by said arm at an angle to the surface of the work-piece whereby the cut made by the torch produces a bevel edge on the work-piece, the tip of the torch being substantially in transverse alignment with the contact points of the forward carriage wheels, and means for causing movement of the carriage in a predetermined manner to cause the torch to cut a bevel edge on the work-piece having a curved corner of relatively small radius whose center is at that side of the carriage where the torch is located, said means comprising a pair of guide rails between which the carriage is adapted to travel and portions of which are curved about the center of the curved corner to be cut in the work-piece, an arm attached to that side of the carriage where the torch is located, a pair of rollers carried by said arm engaging opposite vertical faces of the corresponding guide rail and located substantially in alignment with the tip of the torch and the contact points of the forward carriage wheels, a second arm attached to the opposite side of the carriage and projecting toward the rear thereof and a pair of rollers carried by said second arm and engaging opposite vertical faces of the other guide rail.

2. Apparatus for cutting metal work-pieces comprising a movable wheeled torch carriage, a gas cutting torch carried by the carriage and supported at one side thereof, said torch having its tip directed at an angle to the surface of the work-piece so that the cut made by the torch produces a bevel edge on the work-piece, and means for guiding the carriage during its movement so that the cut made by the torch has a curved corner of relatively small radius convexed toward the carriage and whose center is at that side of the carriage where the torch is located, said means comprising inner and outer guide rails between which the carriage is adapted to travel and portions of which are curved about the center of the curved corner to be cut in the work-piece, an arm attached to the carriage at the torch side thereof and having a pair of rollers engaging opposite vertical faces of the inner guide rail, and an arm attached to the opposite side of the carriage and having rollers engaging opposite vertical faces of the outer guide rail.

3. Apparatus for cutting metal work-pieces comprising a movable torch carriage having a pair of forward wheels and at least one rear caster wheel, a gas cutting torch carried by the carriage and supported at one side thereof, and means for guiding the carriage during its movement so that the cut made by the torch has a curved corner convexed toward the carriage and whose center is at that side of the carriage where the torch is located, said means comprising inner and outer guide rails between which the carriage is adapted to travel and portions of which are curved about the center of the curved corner to be cut in the work-piece, an arm attached to the torch side of the carriage, a pair of rollers carried by said arm and engaging opposite vertical faces of the inner guide rail and located substantially in alignment with the tip of the torch and the contact points of the forward carriage wheels, a second arm attached to the opposite side of the carriage and projecting toward the rear thereof, a roller arm pivoted to said second arm, and a pair of rollers carried by said roller arm and engaging opposite vertical faces of the outer guide rail.

4. Apparatus for cutting metal work-pieces comprising a movable wheeled torch carriage, a gas cutting torch carried by the carriage and supported at one side thereof, and means for guiding the carriage during its movement so that the cut made by the torch has a curved corner of relatively small radius convexed toward the carriage and whose center is at that side of the carriage where the torch is located, said means comprising inner and outer guide rails between which the carriage is adapted to travel and portions of which are curved about the center of the curved corner to be cut in the work-piece, an arm attached to the carriage at the torch side thereof and having roller means guided by the inner guide rail, and an arm attached to the opposite side of the carriage and having roller means guided by the outer guide rail.

JAMES F. FRANZEN.